US010668953B2

(12) United States Patent
Lee et al.

(10) Patent No.: US 10,668,953 B2
(45) Date of Patent: Jun. 2, 2020

(54) CLOAKING DEVICES WITH CONVERGING LENSES AND A HEXAGONAL PRISM AND VEHICLES COMPRISING THE SAME

(71) Applicant: Toyota Motor Engineering & Manufacturing North America, Inc., Plano, TX (US)

(72) Inventors: Kyu-Tae Lee, Ann Arbor, MI (US); Mindy Zhang, Ann Arbor, MI (US); Songtao Wu, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 200 days.

(21) Appl. No.: 15/945,392

(22) Filed: Apr. 4, 2018

(65) Prior Publication Data
US 2020/0023906 A1    Jan. 23, 2020

(51) Int. Cl.
*B62D 25/04* (2006.01)
*G02B 5/04* (2006.01)
*G02B 3/08* (2006.01)

(52) U.S. Cl.
CPC .............. *B62D 25/04* (2013.01); *G02B 3/08* (2013.01); *G02B 5/04* (2013.01)

(58) Field of Classification Search
CPC ............. B62D 25/04; G02B 3/08; G02B 5/04
See application file for complete search history.

(56) References Cited

U.S. PATENT DOCUMENTS 5,392,161 A  *  2/1995  Weder .................... A63H 33/22
                                                                      359/861
9,405,118 B1 *  8/2016  Lu ........................... G02B 27/00
(Continued)

FOREIGN PATENT DOCUMENTS

CN          101299079 A      11/2008
CN          102436023 A       5/2012
(Continued)

OTHER PUBLICATIONS

Howell et al. "Amplitude-only, passive, broadband, optical spatial cloaking of very large objects" Applied Optics, vol. 53, No. 9, pp. 1958-1963 (Year: 2014).*
(Continued)

*Primary Examiner* — George G King
(74) *Attorney, Agent, or Firm* — Dinsmore & Shohl LLP

(57) ABSTRACT

A cloaking device assembly comprises an object-side, an image-side, a reference optical axis extending from the object-side to the image-side, a cloaked region positioned between the object-side and the image-side and a cloaked article positioned within the cloaked region. An object-side converging lens is positioned on the object-side, an image-side converging lens is positioned on the image-side, and a hexagonal prism is positioned within the cloaked region between the object-side converging lens and the image-side converging lens. Light from an object positioned on the object-side of the cloaking device and obscured by the cloaked region propagates through the object-side converging lens, the hexagonal prism, and the image-side converging lens to form an image of the object on the image-side of the cloaking device such that the cloaked region and the cloaked article within the cloaked region do not appear to be positioned between the object and the image.

13 Claims, 7 Drawing Sheets

(56) References Cited

U.S. PATENT DOCUMENTS

| | | | |
|---|---|---|---|
| 2015/0183375 A1* | 7/2015 | Wu | G02B 17/023 |
| | | | 359/734 |
| 2015/0248013 A1 | 9/2015 | Chen et al. | |
| 2017/0227781 A1 | 8/2017 | Banerjee et al. | |
| 2019/0308557 A1* | 10/2019 | Lee | B60R 1/00 |

FOREIGN PATENT DOCUMENTS

| | | |
|---|---|---|
| CN | 105340811 A | 2/2016 |
| CN | 104950428 B | 12/2017 |
| WO | 2017007526 A2 | 1/2017 |

OTHER PUBLICATIONS

Ball, Philip, "Invisibility cloak" hides cats and fish, Nature magazine, Jun. 11, 2013; URL: https://www.scientificamerican.com/article/invisibility-cloak-hides-cats-and-fish/.

* cited by examiner

CLOAKING DEVICES WITH CONVERGING LENSES AND A HEXAGONAL PRISM AND VEHICLES COMPRISING THE SAME

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device comprises an object-side, an image-side, a reference optical axis extending from the object-side to the image-side, and a cloaked region positioned between the object-side and the image-side. An object-side converging lens is positioned on the object-side, an image-side converging lens is positioned on the image-side, and a hexagonal prism is positioned within the cloaked region between the object-side converging lens and the image-side converging lens. Light from an object positioned on the object-side of the cloaking device and obscured by the cloaked region propagates through the object-side converging lens, the hexagonal prism, and the image-side converging lens to form an image of the object on the image-side of the cloaking device such that the cloaked region does not appear to be positioned between the object and the image.

In some embodiments, the object-side converging lens and the image-side converging lens each have an outward facing convex surface and an inward facing planar surface. The hexagonal prism may comprise a first object-side face, a first image-side face, and a first total internal reflection (TIR) face on a first side of the reference optical axis, and a second object-side face, a second image-side face, and a second TIR face on a second side of the reference optical axis opposite the first side. The first object-side face and the second object-side face may form an object-side apex on the reference optical axis, and the first image-side face and the second image-side face form an image-side apex on the reference optical axis. In some embodiments, the hexagonal prism is an elongated hexagonal prism.

A portion of light from the object on the object-side of the cloaking device may propagate through the cloaking device via a first optical path of: object—outward facing convex surface of object-side converging lens—inward facing planar surface of object-side converging lens—first object-side face of hexagonal prism—second TIR face of hexagonal prism—second image-side face of hexagonal prism—inward facing planar surface of image-side converging lens—outward facing convex surface of image-side converging lens—image. Also, another portion of light from the object on the object-side of the cloaking device may propagate through the cloaking device via a second optical path of: object—outward facing convex surface of object-side converging lens—inward facing planar surface of object-side converging lens—second object-side face of hexagonal prism—first TIR face of hexagonal prism—first image-side face of hexagonal prism—inward facing planar surface of image-side converging lens—outward facing convex surface of image-side converging lens—image.

Light propagating through the hexagonal prism may be totally internally reflected within the hexagonal prism. Also, light from the object may be focused onto the hexagonal prism by the object-side converging lens and light focused onto the hexagonal prism by the object-side converging lens is totally internally reflected within the hexagonal prism. The light totally internally reflected within the hexagonal prism propagates to and is incident on the image-side converging lens and the light incident on the image-side converging lens is focused generally parallel to light from the object incident on the object-side lens to form the image of the object on the image-side of the cloaking device. The object-side converging lens and the image-side converging lens may be a pair of plano-convex lenses, a pair of Fresnel lenses or a plano-convex lens and a Fresnel lens.

In another embodiment, a cloaking device assembly comprises an object-side, an image-side, a reference optical axis extending from the object-side to the image-side, a cloaked region positioned between the object-side and the image-side, and a cloaked article positioned within the cloaked region. An object-side converging lens with an outward facing convex surface and an inward facing planar surface is positioned on the object-side, and an image-side converging lens with an outward facing convex surface and an inward facing planar surface is positioned on the image-side. A hexagonal prism is included and positioned within the cloaked article between the object-side converging lens and the image-side converging lens. Light from an object positioned on the object-side of the cloaking device and obscured by the cloaked region propagates through the object-side converging lens, the hexagonal prism and the image-side converging lens to form an image of the object on the image-side of the cloaking device such that the cloaked region and the cloaked article within the cloaked region do not appear to be positioned between the object and the image. That is, the cloaked article positioned within the cloaked region appears transparent.

The hexagonal prism may comprise a first object-side face, a first image-side face, and a first total internal reflection (TIR) face positioned on a first side of the reference optical axis, and a second object-side face, a second image-side face, and a second TIR face positioned on a second side of the reference optical axis opposite the first side. The first TIR face extends between the first object-side face and the first image-side face, and the second TIR face extends between the second object-side face and the second image-side face. In some embodiments, the hexagonal prism is an elongated hexagonal prism.

A portion of light from the object on the object-side may propagate through the cloaking device via a first optical path of: object—outward facing convex surface of object-side converging lens—inward facing planar surface of object-side converging lens—first object-side face of hexagonal prism—second TIR face of hexagonal prism—second image-side face of hexagonal prism—inward facing planar surface of image-side converging lens—outward facing convex surface of image-side converging lens—image. Also, another portion of light from the object on the object-side may propagate through the cloaking device via a second optical path of: object—outward facing convex surface of object-side converging lens—inward facing planar surface of object-side converging lens—second object-side face of hexagonal prism—first TIR face of hexagonal prism—first image-side face of hexagonal prism—inward facing planar surface of image-side converging lens—outward facing convex surface of image-side converging lens—image. Accordingly, light from the object incident on the object-side converging lens may be focused onto the hexagonal prism by the object-side converging lens, totally internally reflected within the hexagonal prism, and focused by the image-side converging lens generally parallel to light from the object incident on the object-side converging lens to form the image of the object on the image-side of the cloaking device.

In still another embodiment, a vehicle comprises a pillar and a cloaking device positioned on the pillar. The cloaking device comprises an object-side, an image-side, and a cloaked region. The object-side is positioned on an exterior of the vehicle, the image-side is positioned within an interior of the vehicle, and the pillar is positioned within the cloaked region. An object-side converging lens and an image-side converging lens are included and each of the converging lenses have an outward facing convex surface and an inward facing planar surface. Also, a hexagonal prism is positioned within the pillar between object-side converging lens and the image-side converging lens. Light from an object positioned on the object-side of the cloaking device and obscured by the cloaked region is focused onto the hexagonal prism by the object-side converging lens, totally internally reflected within the hexagonal prism, and propagates to and is incident on the image-side converging lens. The image-side converging lens focuses the incident light from the hexagonal prism to form an image of the object on the image-side of the cloaking device such that the cloaked region does not appear to be positioned between the object and the image.

In some embodiments, the hexagonal prism comprises a first object-side face, a first image-side face, and a first total internal reflection (TIR) face extending between the first object-side face and the first image-side face, and a second object-side face, a second image-side face, a second TIR face extending between the second object-side face and the second image-side face. Also, the hexagonal prism may be an elongated hexagonal prism.

A portion of light from the object on the object-side may propagate through the cloaking device via a first optical path of: object—outward facing convex surface of object-side converging lens—inward facing planar surface of object-side converging lens—first object-side face of hexagonal prism—second TIR face of hexagonal prism—second image-side face of hexagonal prism—inward facing planar surface of image-side converging lens—outward facing convex surface of image-side converging lens—image. Also, another portion of light from the object may propagate through the cloaking device via a second optical path of: object—outward facing convex surface of object-side converging lens—inward facing planar surface of object-side converging lens—second object-side face of hexagonal prism—first TIR face of hexagonal prism—first image-side face of hexagonal prism—inward facing planar surface of image-side converging lens—outward facing convex surface of image-side converging lens—image.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a cloaked region, a pair of converging lenses, and a prism positioned within the cloaked region between the pair of converging lenses. The cloaking devices described herein may utilize a hexagonal prism, plano-convex lenses and/or Fresnel lenses to focus, reflect, diverge, and re-focus light from an object. Cloaking devices may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the converging lenses and the coherent image guide allow a driver to perceive an image which, if not for the cloaking device, would be obstructed by a pillar of the vehicle. Various embodiments of cloaking devices and methods for using the same will be described in further detail herein with specific reference to the appended drawings.

Figure 1:
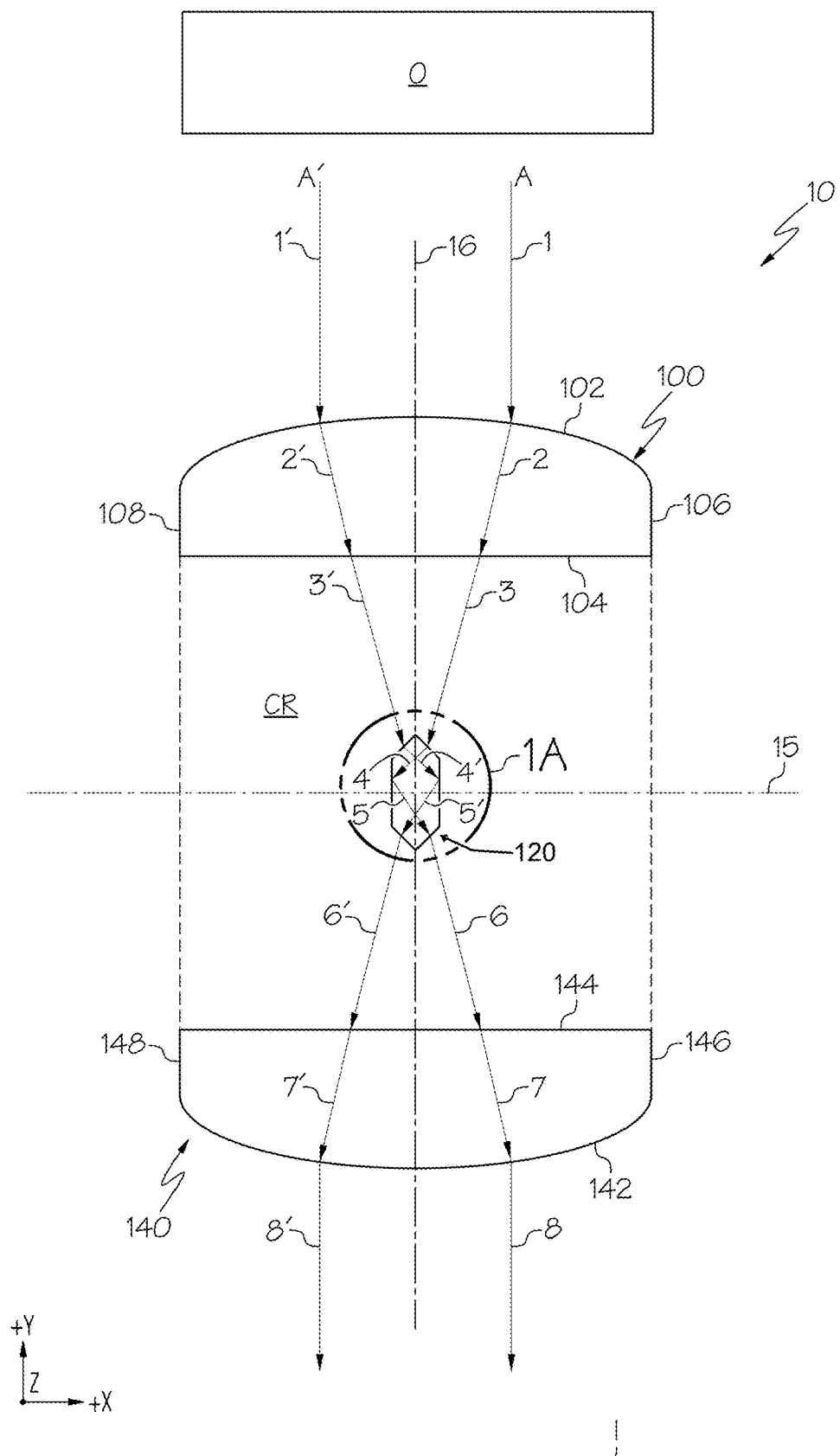
FIG. 1 schematically depicts a top view of a cloaking device according to one or more embodiments disclosed and described herein.

FIG. 1 generally depicts one embodiment of a cloaking device. The cloaking device includes a cloaked region that is at least partially bounded by a pair of converging lenses. Positioned within the cloaked region between the pair of converging lenses is a hexagonal prism. Light from an object positioned on an object-side of the cloaking device and incident on a converging lens positioned on an object-side of the cloaking device is focused onto the hexagonal prism as depicted in FIG. 1. Light that is focused onto the hexagonal prism is totally internally reflected within the hexagonal prism, diverges, and propagates to and is incident on a converging lens positioned on an image-side of the cloaking device. Light that propagates from the hexagonal prism and is in incident on the converging lens positioned on the image-side of the cloaking device is focused generally parallel to the light from the object that is incident on the cloaking device side to provide an image on the image-side of the cloaking device.

As used herein, the phrase "converging lens" and "converging lenses" refer to a lens and lenses that focus incident parallel light to a focal point or focal line and focus incident diverging light to parallel light. The term "parallel" and phrases "parallel light" and "light parallel" as used herein to refer to collimated light, i.e., light rays propagating parallel to each other. The terms "diverges" and "diverging" and the phrase "diverging light" as used herein refer to light rays propagating away from each other. Accordingly, a beam of parallel light has a generally constant cross-sectional area with increasing distance traveled by the beam of parallel light and a beam of diverging light has an increasing cross-sectional area with increasing distance traveled by the beam of diverging light from the source.

Still referring to FIG. 1, embodiments of a cloaking device include a cloaking device assembly 10 with an object-side 12, an image-side 14, a pair of plano-convex lenses 100, 140, and a hexagonal prism 120. A cloaked region CR is at least partially bounded by and positioned between the pair of plano-convex lenses 100, 140. The object-side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. Each of the plano-convex lenses 100, 140, has a length along the X-axis, a thickness along the Y-axis and a height along the Z-axis of the coordinate axes shown in the figures. That is, the X-axis shown in the figures extends along a length of the plano-convex lenses 100, 140, the Y-axis shown in the figures extends along a thickness of the plano-convex lenses 100, 140, and the Z-axis shown in the figures extends along a height of the plano-convex lenses 100, 140. The plano-convex lens 100 may be positioned on the object-side 12 of the cloaking device assembly 10 to face an object 'O' and may be referred to herein as an object-side plano-convex lens 100. The plano-convex lens 140 may be positioned on the image-side 14 of the cloaking device assembly 10 to provide an image 'I' formed by the cloaking device assembly 10 and may be referred to herein as an image-side plano-convex lens 140.

The object-side plano-convex lens 100 and the image-side plano-convex lens 140 each have an outward facing convex surface 102, 142, an inward facing planar surface 104, 144, a first end 106, 146, and a second end 108, 148, respectively. The outward facing convex surfaces 102, 142 and the inward facing planar surfaces 104, 144 of the object-side plano-convex lens 100 and the image-side plano-convex lens 140, respectively, extend between the first ends 106, 146 and the second ends 108, 148, respectively. As used herein the phrase "inward facing surface" refers to a surface that faces towards or is proximal to a cloaked region of a cloaking device and the phrase "outward facing surface" refers to a surface facing away or distal from the cloaked region.

Figure 1A:
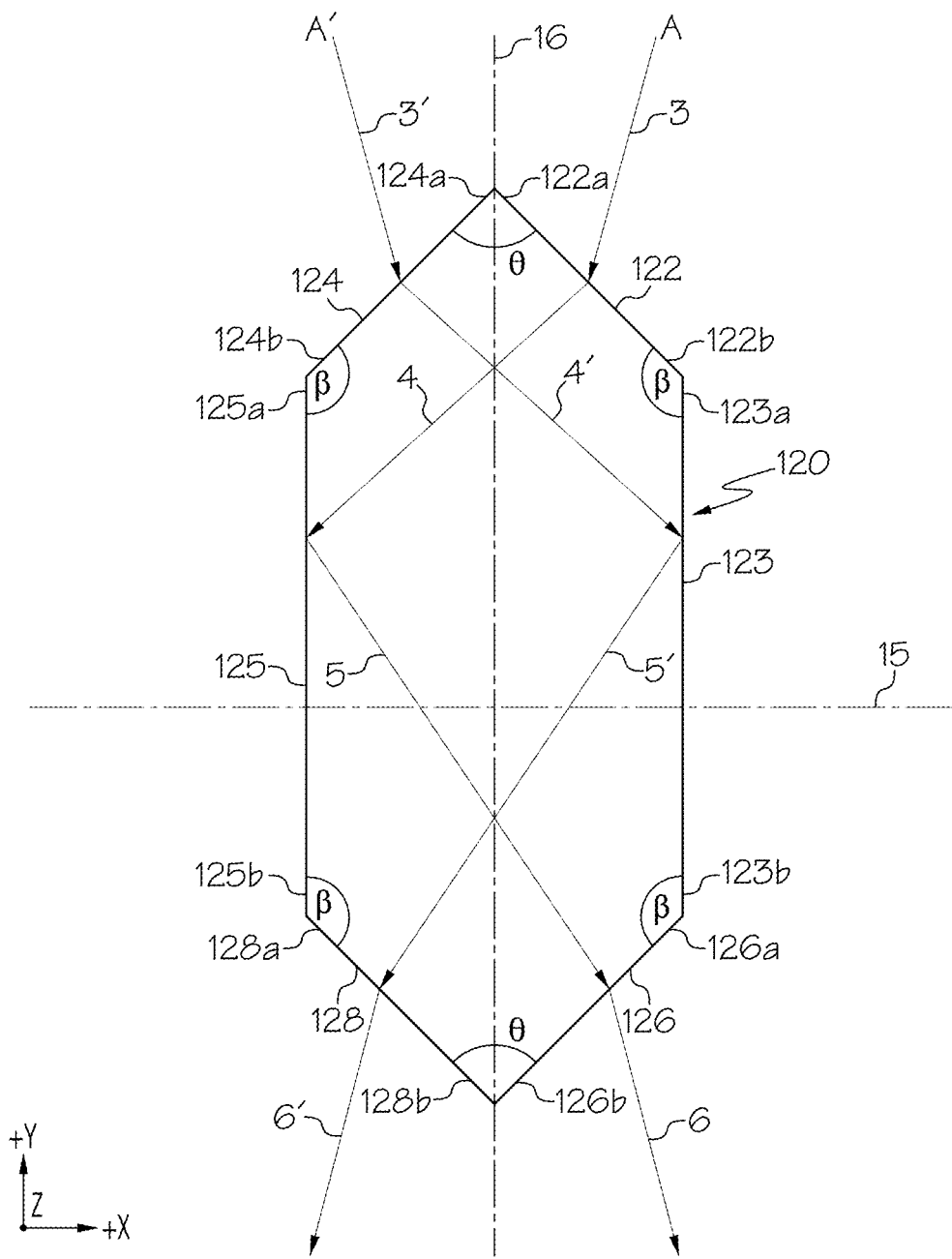
FIG. 1A schematically depicts an enlarged view of section 1A in FIG. 1.

Referring now to FIGS. 1 and 1A, the hexagonal prism 120 has a pair of object-side faces 122, 124 positioned on the object-side 12 and a pair of image-side faces 126, 128 positioned on the image-side 14. A total internal reflection (TIR) face 123 extends between the pair of faces 122, 126 and a TIR face 125 extends between the pair of faces 124, 128. The object-side face 122, the TIR face 123, and the image-side face 126 may be positioned on a first side (+X direction) of a reference optical axis 16 extending from the object-side 12 to the image-side 14 and may be referred to herein as a first object-side face 122, a first TIR face 123, and a first image-side face 126, respectively. The object-side face 124, the TIR face 125, and the image-side face 128 may be positioned on a second side (−X direction) of the reference optical axis 16 opposite the first side and may be referred to herein as a second object-side face 124, a second TIR face 125, and a second image-side face 128, respectively.

The hexagonal prism faces 122, 124, 126, 128 may have an apex end 122a, 124a, 126a, 128a and a side end 122b, 124b, 126b, 128b, respectively. The side ends 122b, 124b, 126b, 128b are spaced apart from the apex ends 122a, 124a, 126a, 128a, respectively, and the faces 122, 124, 126, 128 extend between the apex ends 122a, 124a, 126a, 128a and the side ends 122b, 124b, 126b, 128b respectively. The apex ends 122a, 124a of the object-side faces 122, 124, respectively, meet or intersect at an object-side apex 190. In the alternative, or in addition to, the apex ends 126a, 128a of the two image-side faces 126, 128, respectively, meet or intersect at an image-side apex 192. In such embodiments, the reference optical axis 16 bisects the object-side apex 190 and the image-side apex 192, and may be a centerline between the first side (+X direction) and the second side (−X direction) of the cloaking device assembly 10. The TIR faces 123, 125 may have an object-side end 123a, 125a, respectively, and an image-side end 123b, 125b, respectively. The image-side ends 123b, 125b are spaced apart from the object-side ends 123a, 125a, respectively, and the TIR faces 123, 125 extend between the object-side ends 123a, 125a and the image-side ends 123b, 125b, respectively. Distances between the apex ends 122a, 124a, 126a, 128a and the side ends 122b, 124b, 126b, 128b of the faces 122, 124, 126, 128, respectively, as measured in the X-Y plane depicted in the figures, are referred to herein as the lengths of the faces 122, 124, 126, 128, respectively. That is, the length of each the faces 122, 124, 126, 128 is the distance measured in the X-Y plane between each of the apex ends 122a, 124a, 126a, 128a and the side ends 122b, 124b, 126b, 128b, respectively. Also, distances between the object-side ends 123a, 125a and the image-side ends 123b, 125b, respectively, as measured in the X-Y plane depicted in the figures, are referred to herein as the lengths of the first TIR face 123 and the second TIR face 125, respectively.

In some embodiments, the hexagonal prism 120 may be an elongated hexagonal prism. As used herein, the phrase "elongated hexagonal prism" refers to a hexagonal prism comprising a pair of parallel faces having a length greater than a length of the remaining faces of the hexagonal prism. For example, the hexagonal prism 120 depicted in the figures is an elongated prism with the lengths of the first TIR face 123 and second TIR face 125 greater than the length of each of the object-sides faces 122, 124 and image-side faces 126, 128. It should be understood that the length of the first TIR face 123 and the length of second TIR face 125 may be equal. Also, the lengths of each of the faces 122, 124, 126, 128 may be equal.

The first object-side face 122 and the first image-side face 126 are oriented at an angle 'θ' relative to the second object-side face 124 and the second image-side face 128, respectively, and the first object-side face 122 and the first image-side face 126 are oriented at an angle 'β' relative to the first TIR face 123, and the second object-side face 124 and the second image-side face 128 are oriented at an angle 'β' relative to the second TIR face 125.

In some embodiments, the plano-convex lenses 100, 140, may be cylindrical plano-convex lenses with a rectangular cross-section in the X-Z plane depicted in the figures. In such embodiments, the first object-side plano-convex lens 100 may comprise an object-side focal line (not shown) extending along the Z-axis and positioned inwardly (−Y direction) from the object-side plano-convex lens 100 such that light from an object 'O' on the object-side 12 of the cloaking device assembly 10 incident on the outward facing convex surface 102 is focused onto the object-side faces 122, 124 of the hexagonal prism 120. Also, the image-side plano-convex lens 140 may comprise a second object-side focal line (not shown) extending along the Z-axis and positioned inwardly (+Y direction) from the image-side plano-convex lens 140 such that light propagating from the hexagonal prism 120 and incident on the inward facing planar surface 144 is focused generally parallel to the light from an object 'O' on the object-side 12 of the cloaking device assembly 10 incident on the outward facing convex surface 102 of the object-side plano-convex lens 100.

In other embodiments, the plano-convex lenses 100, 140 may be spherical plano-convex lenses with a circular cross-section in the X-Z plane depicted in the figures. In such embodiments, the object-side plano-convex lens 100 may comprise a first object-side focal point (not shown) positioned inwardly (−Y direction) from the object-side plano-convex lens 100 such that light from an object 'O' on the object-side 12 of the cloaking device assembly 10 incident on the outward facing convex surface 102 is focused onto the object-side faces 122, 124 of the hexagonal prism 120. Also, the image-side plano-convex lens 140 may comprise a second object-side focal point (not shown) positioned inwardly (+Y direction) from the image-side plano-convex lens 140 such that light propagating from the hexagonal prism 120 and incident on the inward facing planar surface 144 is focused generally parallel to the light from an object 'O' on the object-side 12 of the cloaking device assembly 10 incident on the outward facing convex surface 102 of the object-side plano-convex lens 100.

The plano-convex lenses 100, 140, other converging lenses disclosed herein, the hexagonal prism 120, and other hexagonal prisms disclosed herein, may be formed from any lens or prism material suitable for focusing and/or reflecting light rays. Non-limiting examples of suitable plano-convex lens and hexagonal prism materials include glass, acrylic polymers, polycarbonate polymers and rigid vinyl polymers.

Still referring to FIGS. 1 and 1A, light from the object O on the first side (+X direction) and the second side (−X direction) of the reference optical axis 16 travels from the object-side 12 and forms an image 'I' on the image-side 14 via two different optical paths. Particularly, light from the object positioned above (+Y direction) the cloaking device assembly 10 on the first side (+X direction) of the reference optical axis 16 (shown as arrow '1' in FIG. 1) that is incident on the object-side plano-convex lens 100 travels from the object-side 12 and forms a portion of an image 'I' via a first optical path 'A'. Light from the object positioned above (+Y direction) the cloaking device assembly 10 on the second side (−X direction) of the reference optical axis 16 opposite the first side that is incident on the object-side plano-convex lens 100 (shown as arrow '1"' in FIG. 1) travels from the object-side 12 and forms a portion of the image I via a second optical path 'A"'.

Regarding the first optical path A on the first side (+X direction) of the reference optical axis 16, the object-side plano-convex lens 100 is positioned relative to the hexagonal prism 120 such that light 1 from the object O propagates through the object-side plano-convex lens 100 (shown as arrow '2' in FIG. 1) where it is refracted, exits and propagates to the hexagonal prism 120 (shown as arrow '3' in FIG. 1). The hexagonal prism 120 is positioned relative to the image-side plano-convex lens 140 such that light 3 propagates through the hexagonal prism 120 (shown as arrows '4' and '5') where it is refracted, reflected, diverges and propagates to the image-side plano-convex lens 140 (shown as arrow '6'). The image-side plano-convex lens 140 is positioned relative to the hexagonal prism 120 such that light propagating from the hexagonal prism 120 and incident on the image-side plano-convex lens 140 propagates through the image-side plano-convex lens 140 (shown as arrow '7') and is focused generally parallel to light 1 (shown as arrow '8') and forms a portion of the image on the first side (+X direction) of the reference optical axis 16. In embodiments, light 1 incident on the outward facing convex surface 102 of the object-side plano-convex lens 100 is refracted and propagates as light 2 (FIG. 1) to the inward facing planar surface 104. Light 2 is refracted at the inward facing planar surface 104 and focused onto the first object-side face 122 (FIG. 1A) as light 3. Light 3 is refracted and propagates from the first object-side face 122 to the second TIR face 125 (FIG. 1A) as light 4 where it is totally internally reflected and diverges as light 5. Light 5 propagates to the first image-side face 126 where it is refracted and propagates to the inward facing planar surface 144 of the image-side plano-convex lens 140 as light 6. Light 6 is refracted at the inward facing planar surface 144 and propagates as light 7 to the outward facing convex surface 142 of the image-side plano-convex lens 140. Light 7 is refracted at the outward facing convex surface 142 and focused generally parallel to light 1 to form the portion of the image I of the object O on the first side (+X direction) of the reference optical axis 16.

Accordingly, light from the object O may travel from the object-side 12 to the image-side 14 via the first optical path A: object O—outward facing convex surface 102 of object-side plano-convex lens 100—inward facing planar surface 104 of object-side plano-convex lens 100—first object-side face 122 of hexagonal prism 120—second TIR face 125 of hexagonal prism 120—first image-side face 126 of hexagonal prism 120—inward facing planar surface 144 of image-side plano-convex lens 140—outward facing convex surface 142 of image-side plano-convex lens 140—Image I. That is, light from the object O may travel from the object-side 12 to the image-side 14 via the first optical path A: object O—refraction at outward facing convex surface 102 of object-side plano-convex lens 100—refraction at inward facing planar surface 104 of object-side plano-convex lens 100—refraction at first object-side face 122 of hexagonal prism 120—total internal reflection at second TIR face 125 of hexagonal prism 120—refraction at first image-side face 126 of hexagonal prism 120—refraction at inward facing planar surface 144 of image-side plano-convex lens 140—refraction at outward facing convex surface 142 of image-side plano-convex lens 140—Image I.

Regarding the second optical path A' on the second side (−X direction) of the reference optical axis 16, the object-side plano-convex lens 100 is positioned relative to the hexagonal prism 120 such that light 1' from the object O propagates through the object-side plano-convex lens 100 (shown as arrow '2'' in FIG. 1) where it is refracted, exits and propagates to the hexagonal prism 120 (shown as arrow '3' in FIG. 1). The hexagonal prism 120 is positioned relative to the image-side plano-convex lens 140 such that light 3' propagates through the hexagonal prism 120 (shown as arrows '4'' and '5'') where it is refracted, reflected, diverges and propagates to the image-side plano-convex lens 140 (shown as arrow '6''). The image-side plano-convex lens 140 is positioned relative to the hexagonal prism 120 such that light propagating from the hexagonal prism 120 and incident on the image-side plano-convex lens 140 propagates through the image-side plano-convex lens 140 (shown as arrow '7'') and is focused generally parallel to light 1' (shown as arrow '8'') and forms a portion of the image on the second side (−X direction) of the reference optical axis 16. In embodiments, light 1' incident on the outward facing convex surface 102 of the object-side plano-convex lens 100 is refracted and propagates as light 2' (FIG. 1) to the inward facing planar surface 104. Light 2' is refracted at the inward facing planar surface 104 and focused onto the second object-side face 124 (FIG. 1A) as light 3'. Light 3' is refracted and propagates from the second object-side face 124 to the first TIR face 123 (FIG. 1A) as light 4' where it is totally internally reflected and diverges as light 5'. Light 5' propagates to the second image-side face 128 where it is refracted and propagates to the inward facing planar surface 144 of the image-side plano-convex lens 140 as light 6'. Light 6' is refracted at the inward facing planar surface 144 and propagates as light 7' to the outward facing convex surface 142 of the image-side plano-convex lens 140. Light 7' is refracted at the outward facing convex surface 142 and focused generally parallel to light 1' to form the portion of the image I of the object O on the second side (−X direction) of the reference optical axis 16.

Accordingly, light from the object O may travel from the object-side 12 to the image-side 14 via the first optical path A': object O—outward facing convex surface 102 of object-side plano-convex lens 100—inward facing planar surface 104 of object-side plano-convex lens 100—second object-side face 124 of hexagonal prism 120—first TIR face 123 of hexagonal prism 120—second image-side face 128 of hexagonal prism 120—inward facing planar surface 144 of image-side plano-convex lens 140—outward facing convex surface 142 of image-side plano-convex lens 140—Image I. That is, light from the object O may travel from the object-side 12 to the image-side 14 via the first optical path A': object O—refraction at outward facing convex surface 102 of object-side plano-convex lens 100—refraction at inward facing planar surface 104 of object-side plano-convex lens 100—refraction at second object-side face 124 of hexagonal prism 120—total internal reflection at first TIR face 123 of hexagonal prism 120—refraction at second image-side face 128 of hexagonal prism 120—refraction at inward facing planar surface 144 of image-side plano-convex lens 140—refraction at outward facing convex surface 142 of image-side plano-convex lens 140—Image I.

Figure 2:
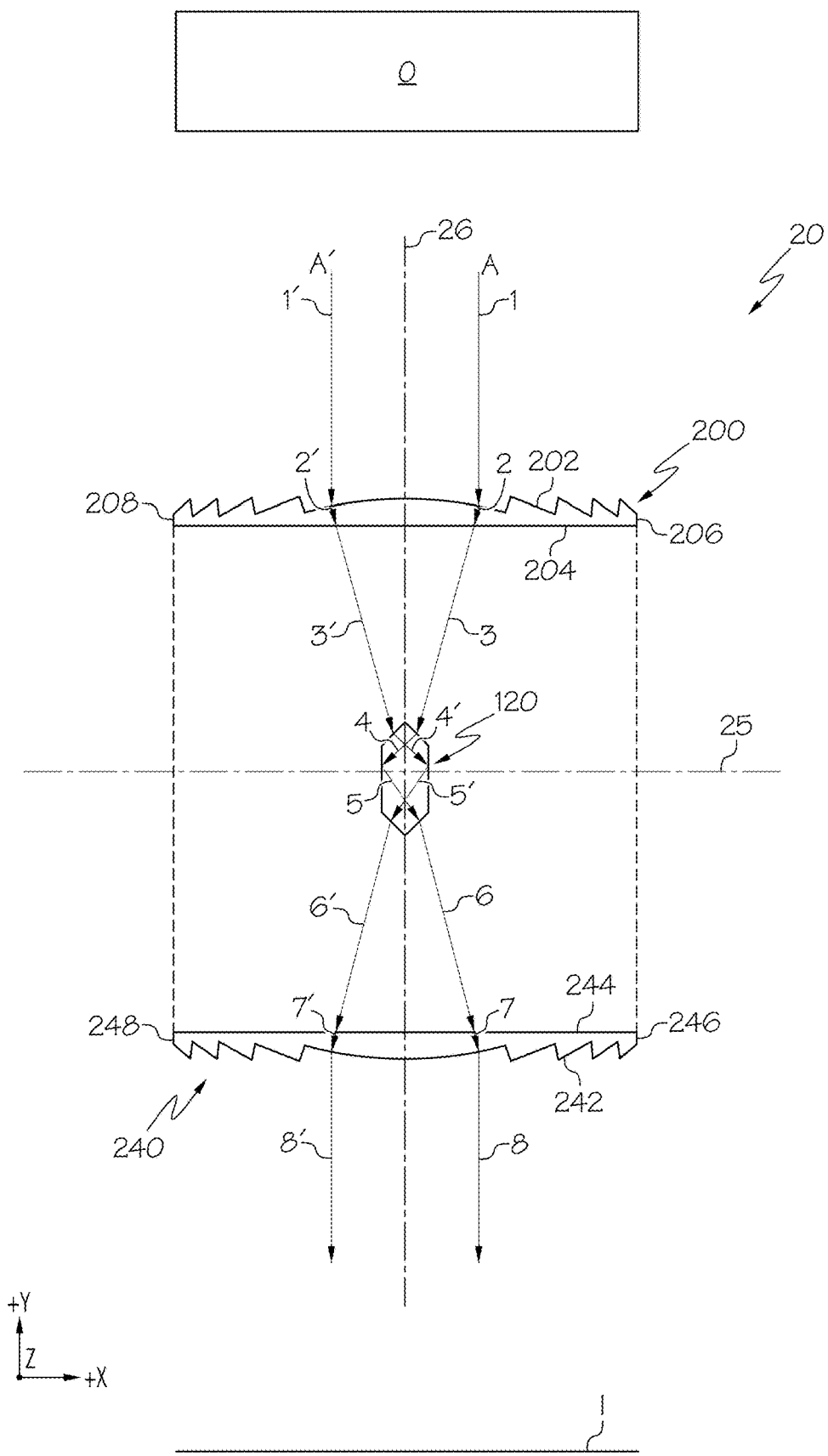
FIG. 2 schematically depicts a top view of a cloaking device according to one or more embodiments disclosed and described herein.

Although FIG. 1 depicts the converging lenses 100, 140 being plano-convex lenses, in some embodiments, the converging lenses 100, 140 are not plano-convex lenses. For example, FIG. 2 depicts a cloaking device assembly 20 with converging lenses 200, 240 comprising Fresnel lenses. Particularly, the cloaking device assembly 20 comprises an object-side 22, an image-side 24, a pair of Fresnel lenses 200, 240, and the hexagonal prism 120. A cloaked region CR is positioned between the pair of Fresnel lenses 200, 240. The object-side 22 is positioned above (+Y direction) a bisecting axis 25 and the image-side 24 is positioned below (−Y direction) the bisecting axis 25. That is, the bisecting axis 25 extends between and delineates the object-side 22 and the image-side 24. Each of the Fresnel lenses 200, 240, has a length along the X-axis, a thickness along the Y-axis and a height along the Z-axis of the coordinate axes shown in the figures. That is, the X-axis shown in the figures extends along a length of the Fresnel lenses 200, 240, the Y-axis shown in the figures extends along a thickness of the Fresnel lenses 200, 240, and the Z-axis shown in the figures extends along a height of the Fresnel lenses 200, 240. The Fresnel lens 200 may be positioned on the object-side 22 of the cloaking device assembly 20 to face an object 'O' and may be referred to herein as an object-side Fresnel lens 200. The Fresnel lens 240 may be positioned on the image-side 24 of the cloaking device assembly 20 to provide an image 'I' formed by the cloaking device assembly 20 and may be referred to herein as an image-side Fresnel lens 240.

The object-side Fresnel lens 200 and the image-side Fresnel lens 240 each have an outward facing Fresnel surface 202, 242, (also referred to herein as an outward facing convex surface) an inward facing planar surface 204, 244, a first end 206, 246, and a second end 208, 248, respectively. The outward facing convex surfaces 202, 242 and the inward facing planar surfaces 204, 244 of the object-side Fresnel lens 200 and the image-side Fresnel lens 240, respectively, extend between the first ends 206, 246 and the second ends 208, 248, respectively.

In some embodiments, the Fresnel lenses 200, 240, may be cylindrical Fresnel lenses with a rectangular cross-section in the X-Z plane depicted in the figures. In such embodiments, the first object-side Fresnel lens 200 may comprise an object-side focal line (not shown) extending along the Z-axis and positioned inwardly (−Y direction) from the object-side Fresnel lens 200 such that light from an object 'O' on the object-side 22 of the cloaking device assembly 20 incident on the outward facing convex surface 202 is focused onto the object-side faces 122, 124 of the hexagonal prism 120. Also, the image-side Fresnel lens 240 may comprise a second object-side focal line (not shown) extending along the Z-axis and positioned inwardly (+Y direction) from the image-side Fresnel lens 240 such that light propagating from the hexagonal prism 120 and incident on the inward facing planar surface 244 is focused generally parallel to the light from an object 'O' on the object-side 22 of the cloaking device assembly 20 incident on the outward facing convex surface 202 of the object-side Fresnel lens 200.

In other embodiments, the Fresnel lenses 200, 240 may be spherical Fresnel lenses with a circular cross-section in the X-Z plane depicted in the figures. In such embodiments, the object-side Fresnel lens 200 may comprise a first object-side focal point (not shown) positioned inwardly (−Y direction) from the object-side Fresnel lens 200 such that light from an object 'O' on the object-side 22 of the cloaking device assembly 20 incident on the outward facing convex surface 202 is focused onto the object-side faces 122, 124 of the hexagonal prism 120. Also, the image-side Fresnel lens 240 may comprise a second object-side focal point (not shown) positioned inwardly (+Y direction) from the image-side Fresnel lens 240 such that light propagating from the hexagonal prism 120 and incident on the inward facing planar surface 244 is focused generally parallel to the light from an object 'O' on the object-side 22 of the cloaking device assembly 20 incident on the outward facing convex surface 202 of the object-side Fresnel lens 200.

Still referring to FIG. 2, light from the object O on the first side (+X direction) and the second side (−X direction) of the reference optical axis 26 travels from the object-side 22 and forms an image 'I' on the image-side 24 via two different optical paths. Particularly, light from the object positioned above (+Y direction) the cloaking device assembly 20 on the first side (+X direction) of the reference optical axis 26 (shown as arrow '1' in FIG. 2) that is incident on the object-side Fresnel lens 200 travels from the object-side 22 and forms a portion of an image 'I' via a first optical path 'A'. Light from the object positioned above (+Y direction) the cloaking device assembly 20 on the second side (−X direction) of the reference optical axis 26 opposite the first side that is incident on the object-side Fresnel lens 200 (shown as arrow '1"' in FIG. 2) travels from the object-side 22 and forms a portion of the image I via a second optical path 'A''.

Regarding the first optical path A on the first side (+X direction) of the reference optical axis 26, the object-side Fresnel lens 200 is positioned relative to the hexagonal prism 120 such that light 1 from the object O propagates through the object-side Fresnel lens 200 (shown as arrow '2' in FIG. 2) where it is refracted, exits and propagates to the hexagonal prism 120 (shown as arrow '3' in FIG. 1). The hexagonal prism 120 is positioned relative to the image-side Fresnel lens 240 such that light 3 propagates through the hexagonal prism 120 (shown as arrows '4' and '5') where it is refracted, reflected, diverges and propagates to the image-side Fresnel lens 240 (shown as arrow '6'). The image-side Fresnel lens 240 is positioned relative to the hexagonal prism 120 such that light propagating from the hexagonal prism 120 and incident on the image-side Fresnel lens 240 propagates through the image-side Fresnel lens 240 (shown as arrow '7') and is focused generally parallel to light 1 (shown as arrow '8') and forms a portion of the image on the first side (+X direction) of the reference optical axis 26. In embodiments, light 1 incident on the outward facing convex surface 202 of the object-side Fresnel lens 200 is refracted and propagates as light 2 to the inward facing planar surface 204. Light 2 is refracted at the inward facing planar surface 204 and focused onto the first object-side face 122 (FIG. 1A) as light 3. Light 3 is refracted and propagates from the first object-side face 122 to the second TIR face 125 (FIG. 1A) as light 4 where it is totally internally reflected and diverges as light 5. Light 5 propagates to the first image-side face 126 where it is refracted and propagates to the inward facing planar surface 244 of the image-side Fresnel lens 240 as light 6. Light 6 is refracted at the inward facing planar surface 244 and propagates as light 7 to the outward facing convex surface 242 of the image-side Fresnel lens 240. Light 7 is refracted at the outward facing convex surface 242 and focused generally parallel to light 1 to form the portion of the image I of the object O on the first side (+X direction) of the reference optical axis 26.

Accordingly, light from the object O may travel from the object-side 22 to the image-side 24 via the first optical path A: object O—outward facing convex surface 202 of object-side Fresnel lens 200—inward facing planar surface 204 of object-side Fresnel lens 200—first object-side face 122 of hexagonal prism 120—second TIR face 125 of hexagonal prism 120—first image-side face 126 of hexagonal prism 120—inward facing planar surface 244 of image-side Fresnel lens 240—outward facing convex surface 242 of image-side Fresnel lens 240—Image I. That is, light from the object O may travel from the object-side 22 to the image-side 24 via the first optical path A: object O—refraction at outward facing convex surface 202 of object-side Fresnel lens 200—refraction at inward facing planar surface 204 of object-side Fresnel lens 200—refraction at first object-side face 122 of hexagonal prism 120—total internal reflection at second TIR face 125 of hexagonal prism 120—refraction at first image-side face 126 of hexagonal prism 120—refraction at inward facing planar surface 244 of image-side Fresnel lens 240—refraction at outward facing convex surface 242 of image-side Fresnel lens 240—Image I.

Regarding the second optical path A' on the second side (−X direction) of the reference optical axis 26, the object-side Fresnel lens 200 is positioned relative to the hexagonal prism 120 such that light 1' from the object O propagates through the object-side Fresnel lens 200 (shown as arrow '2"' in FIG. 1) where it is refracted, exits and propagates to the hexagonal prism 120 (shown as arrow '3' in FIG. 1). The hexagonal prism 120 is positioned relative to the image-side Fresnel lens 240 such that light 3' propagates through the hexagonal prism 120 (shown as arrows '4"' and '5"') where it is refracted, reflected, diverges and propagates to the image-side Fresnel lens 240 (shown as arrow '6"'). The image-side Fresnel lens 240 is positioned relative to the hexagonal prism 120 such that light propagating from the hexagonal prism 120 and incident on the image-side Fresnel lens 240 propagates through the image-side Fresnel lens 240 (shown as arrow '7"') and is focused generally parallel to light 1' (shown as arrow '8"') and forms a portion of the image on the second side (−X direction) of the reference optical axis 26. In embodiments, light 1' incident on the outward facing convex surface 202 of the object-side Fresnel lens 200 is refracted and propagates as light 2' (FIG. 1) to the inward facing planar surface 204. Light 2' is refracted at the inward facing planar surface 204 and focused onto the second object-side face 124 (FIG. 1A) as light 3'. Light 3' is refracted and propagates from the second object-side face 124 to the first TIR face 123 (FIG. 1A) as light 4' where it is totally internally reflected and diverges as light 5'. Light 5' propagates to the second image-side face 128 where it is refracted and propagates to the inward facing planar surface 244 of the image-side Fresnel lens 240 as light 6'. Light 6' is refracted at the inward facing planar surface 244 and propagates as light 7' to the outward facing convex surface 242 of the image-side Fresnel lens 240. Light 7' is refracted at the outward facing convex surface 242 and focused generally parallel to light 1' to form the portion of the image I of the object O on the second side (−X direction) of the reference optical axis 26.

Accordingly, light from the object O may travel from the object-side 22 to the image-side 24 via the second optical path A': object O—outward facing convex surface 202 of object-side Fresnel lens 200—inward facing planar surface 204 of object-side Fresnel lens 200—second object-side face 124 of hexagonal prism 120—first TIR face 123 of hexagonal prism 120—second image-side face 128 of hexagonal prism 120—inward facing planar surface 244 of image-side Fresnel lens 240—outward facing convex surface 242 of image-side Fresnel lens 240—Image I. That is, light from the object O may travel from the object-side 22 to the image-side 24 via the second optical path A': object O—refraction at outward facing convex surface 202 of object-side Fresnel lens 200—refraction at inward facing planar surface 204 of object-side Fresnel lens 200—refraction at second object-side face 124 of hexagonal prism 120—total internal reflection at first TIR face 123 of hexagonal prism 120—refraction at second image-side face 128 of hexagonal prism 120—refraction at inward facing planar surface 244 of image-side Fresnel lens 240—refraction at outward facing convex surface 242 of image-side Fresnel lens 240—Image I.

While FIGS. 1 and 2 schematically depict converging lenses in the form of plano-convex and Fresnel lenses, it should be understood that other forms of converging lenses may be utilized in the cloaking device assemblies described herein. Non-limiting examples of converging lenses, in addition to the plano-convex lenses and Fresnel lenses described above, include biconvex lenses, achromatic lenses, and the like. Also, it should be understood that while the figures schematically depict a cloaking device assembly with a cloaked region bounded by two plano-convex lenses or two Fresnel lenses, cloaking assemblies with a cloaked region bounded by one plano-convex lens and one Fresnel lenses are also contemplated. For example and without limitation, a cloaking device assembly may comprise an object-side plano-convex lens and an image-side Fresnel lens, or in the alternative, an object-side Fresnel lens and an image-side plano-convex lens.

Figure 3:
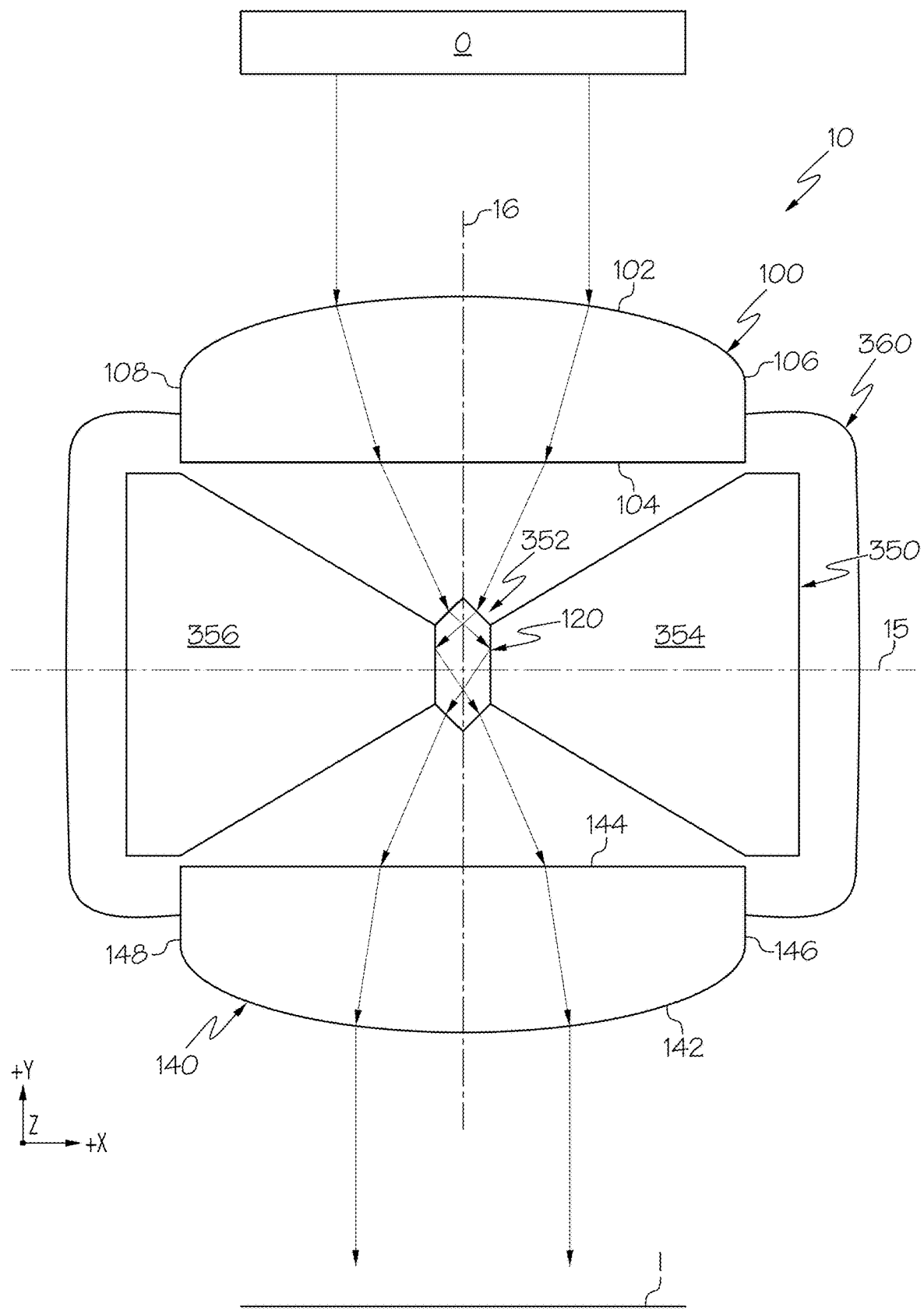
FIG. 3 schematically depicts a top view of the cloaking device in FIG. 1 attached to a cloaked article according to one or more embodiments disclosed and described herein.

Referring now to FIG. 3, a cloaking device assembly attached to a cloaked article is schematically depicted. Particularly, the cloaking device assembly 10 (FIGS. 1, 1A) is schematically depicted attached to a cloaked article 350. The hexagonal prism 120 is positioned within the cloaked article 350 between the pair of plano-convex lenses 100, 140. In embodiments, the cloaked article 350 may include a hole or aperture 352 where the hexagonal prism 120 is positioned such that a first portion 354 of the cloaked article 350 is positioned on the first side (+X direction) of the reference optical axis 16 and a second portion 356 of the cloaked article 350 is positioned on the second side (−X direction) of the reference optical axis 16. In some embodiments, the cloaked article 350 may include a pillar 350, e.g., an A-pillar 350, B-pillar 350, C-pillar 350, D-pillar 350, etc., of a vehicle. In such embodiments, a trim 360 may be attached to the cloaked article 350 and/or the cloaking device assembly 10. Propagation of light from the object O on the object-side 12 of the cloaking device assembly 10 to form the image I on the image-side 14 is equivalent as described for the cloaking device assembly 10 (FIGS. 1, 1A) and is not repeated here. Also, while FIG. 3 depicts the cloaking device assembly 10 with the plano-convex lenses 100, 140, it should be understood that the cloaking device assembly 20 (FIG. 2) comprising the Fresnel lenses 200, 240, or other cloaking devices with converging lenses and a hexagonal prism may be utilized to cloak an article.

Figure 4:
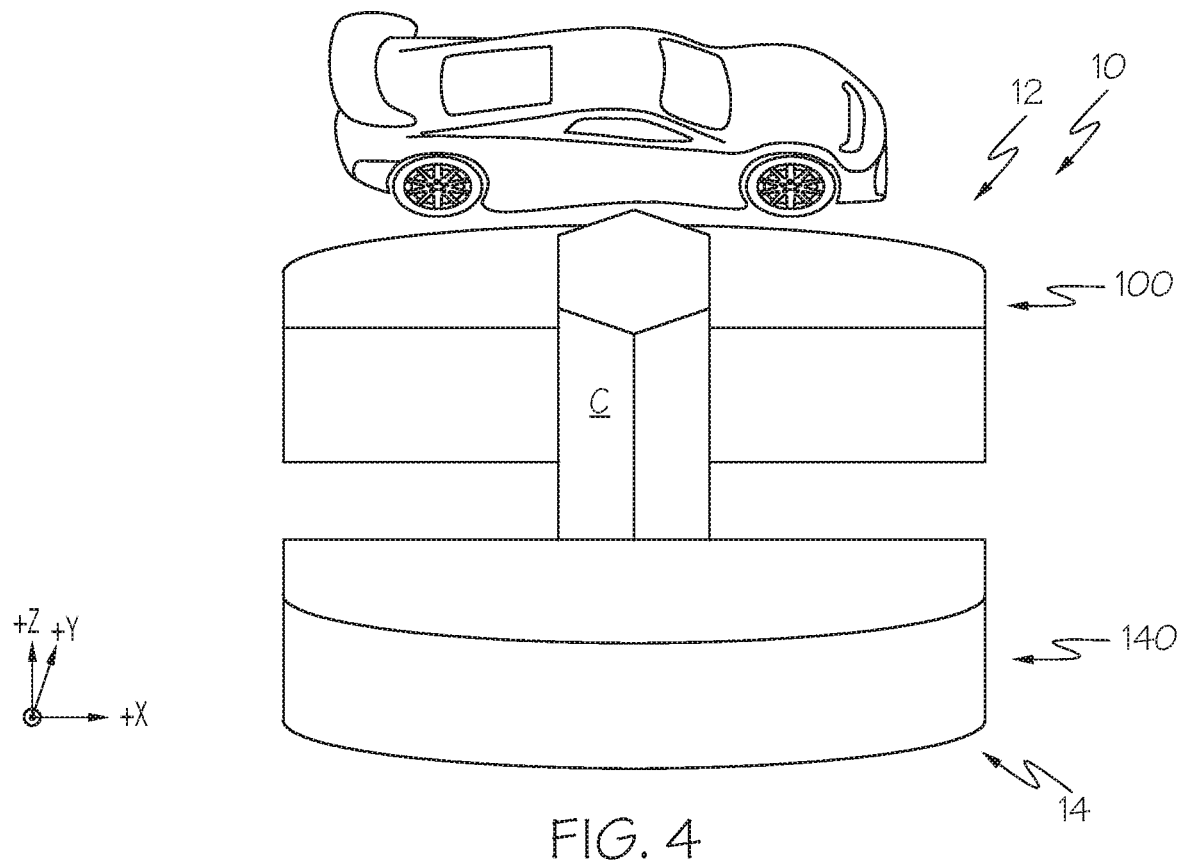
FIG. 4 schematically depicts a top perspective view of the cloaking device of FIG. 1 with a first object on one side of the cloaking device and a second object within the cloaked region of the cloaking device according to one or more embodiments disclosed and described herein.
Figure 5:
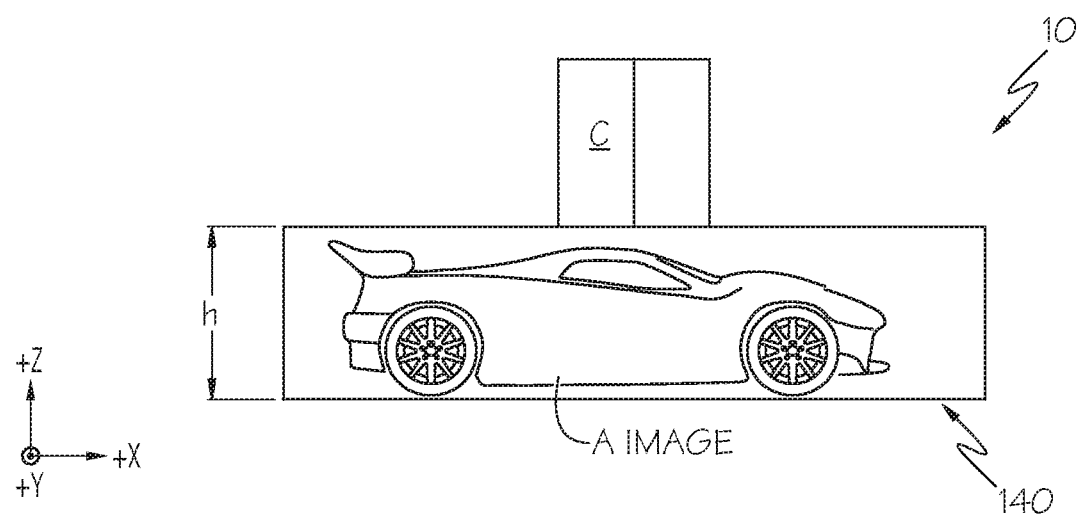
FIG. 5 schematically depicts a side view of the cloaking device of FIG. 4 with the first object on one side of the cloaking device and the second object within the cloaked region of the cloaking device.

Referring now to FIGS. 1, 4 and 5, a top perspective view and a side view of a cloaking device according to embodiments as discussed with respect to FIG. 1 are shown in FIGS. 4 and 5, respectively. Specifically, FIG. 4 is a top perspective view of an article in the form of a column 'C' within the cloaked region CR of the cloaking device assembly 10 and an automobile 'A' located behind the column C on the object-side 12 of the cloaking device assembly 10 in the +Y direction. It should be understood that the hexagonal prism 120 (not shown) is positioned within the column C between the object-side plano-convex lens 100 and the image-side plano-convex lens 140. The column C has a height dimension in the Z direction (increasing height in the +Z direction) greater than the height h of the cloaking device (FIG. 5). FIG. 5 is a side view from the +Y direction of the cloaking device assembly 10 shown in FIG. 1 and shows the portion of the column C that is within the cloaked region is not visible and the automobile A located behind the column C in the +Y direction is visible to an observer viewing the cloaking device assembly 10 in the +Y direction. Accordingly, the column C positioned within the cloaked region is not visible to an observer viewing the image-side 14 of the cloaking device assembly 10 and an image of the automobile A is visible to the observer viewing the image-side 14.

Figure 6:
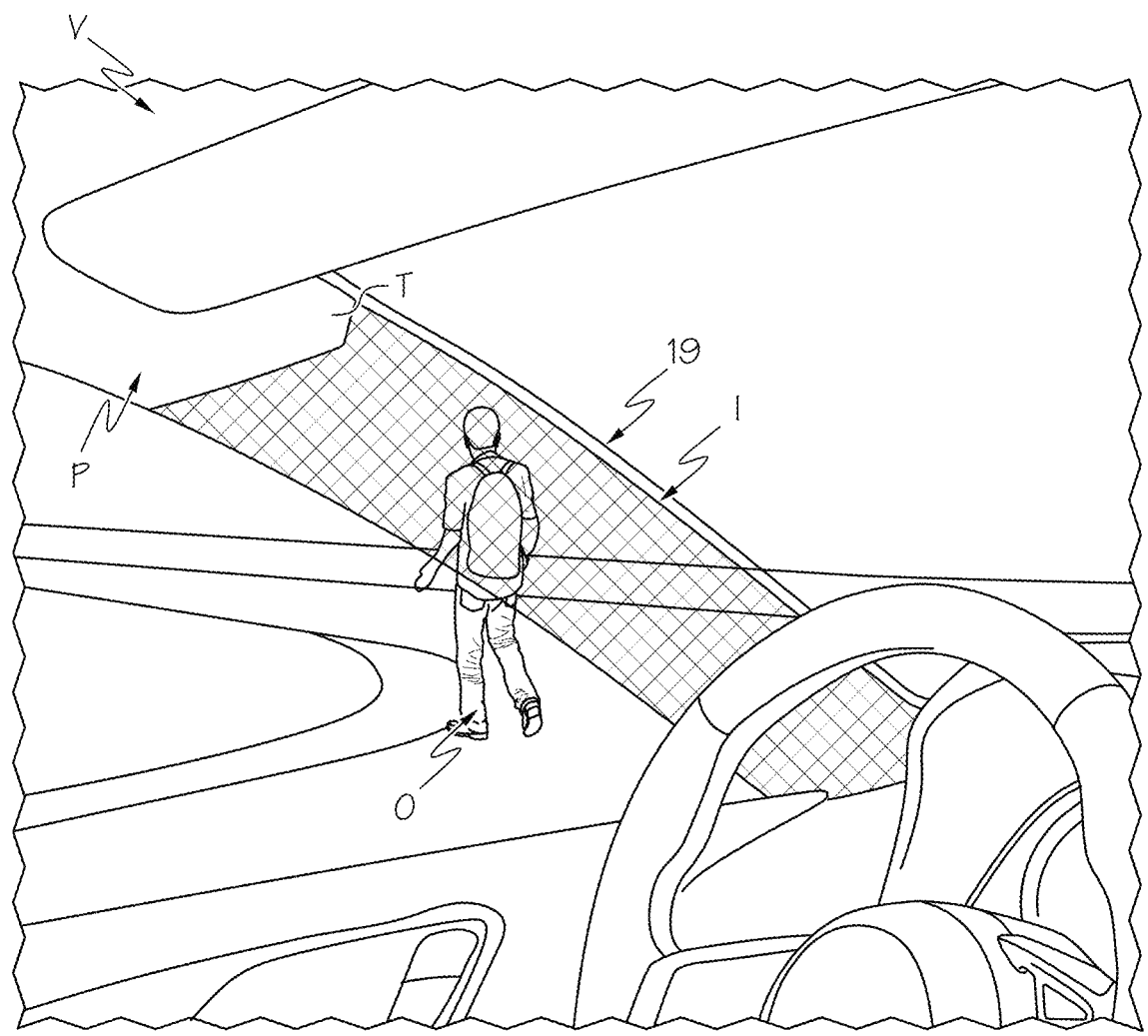
FIG. 6 schematically depicts a cloaking device cloaking a vehicle A-pillar of a vehicle according to one or more embodiments described and illustrated herein.

Referring to FIG. 6, embodiments of a pillar of a vehicle being cloaked by a cloaking device are shown. Particularly, FIG. 6 shows a cloaking device 19 as described herein cloaking a portion of a pillar P of a vehicle V. In some embodiments, the pillar P is an A-pillar. In other embodiments, the pillar P is a B-pillar. In still other embodiments, the pillar P is a C-pillar. A portion of the pillar P is positioned within a cloaked region (not shown) of the cloaking device 19 and a portion of the pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the pillar P cloaked by the cloaking device 19. The cloaking device 19 redirects light reflected from the pedestrian O around the pillar P positioned within the cloaked region of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the pillar P and a blind spot typically created by the pillar P is not as present as when the portion of the pillar P is not positioned within the cloaked region of the cloaking device 19. In embodiments, the pillar P itself serves as the cloaked region, i.e. the pillar P has an outer surface with one or more inward facing surfaces that assist in redirecting light from the pedestrian) around the pillar P. It should be appreciated that cloaking of the pillar P with the cloaking device 19 and bypassing the blind spot produced by the pillar P is performed without the use of metamaterials, video images, cameras, sophisticated electronics, etc.

Examples

Figure 7A:
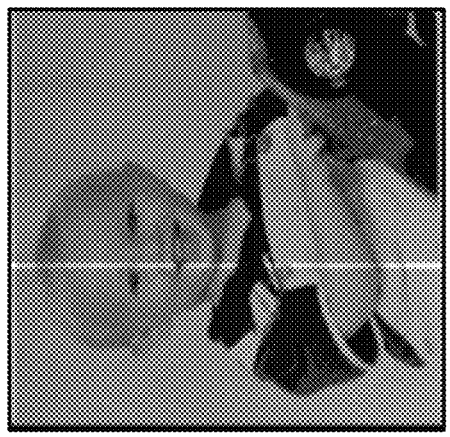
FIG. 7A depicts a computer simulated cloaking image for a cloaking assembly according to FIG. 1 with a 0° misalignment between a reference optical axis and a viewing angle of the cloaking assembly.
Figure 7B:
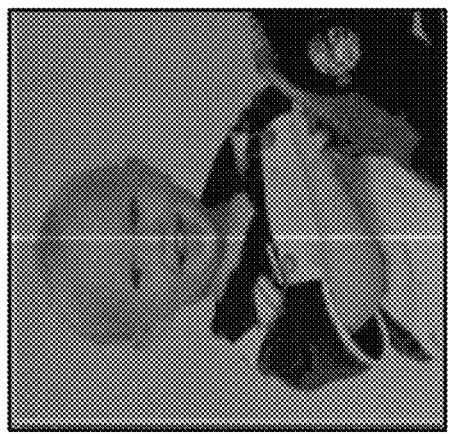
FIG. 7B depicts a computer simulated cloaking image for a cloaking assembly according to FIG. 1 with a 1° misalignment between a reference optical axis and a viewing angle of the cloaking assembly.
Figure 7C:
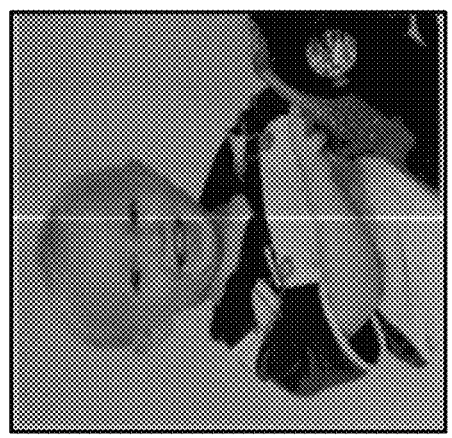
FIG. 7C depicts a computer simulated cloaking image for a cloaking assembly according to FIG. 1 with a 2° misalignment between a reference optical axis and a viewing angle of the cloaking assembly.
Figure 7D:
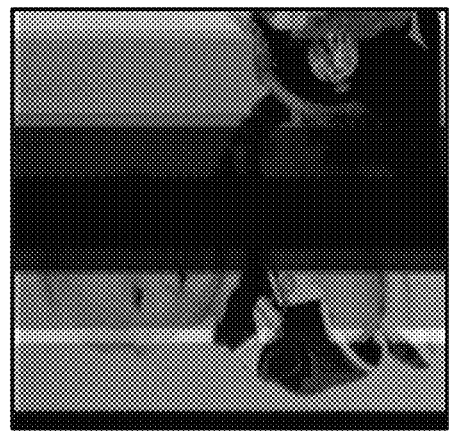
FIG. 7D depicts a computer simulated cloaking image for a cloaking assembly according to FIG. 1 with a 3° misalignment between a reference optical axis and a viewing angle of the cloaking assembly.
Figure 7E:
FIG. 7E depicts a computer simulated cloaking image for a cloaking assembly according to FIG. 1 with a 4° misalignment between a reference optical axis and a viewing angle of the cloaking assembly.
Figure 7F:
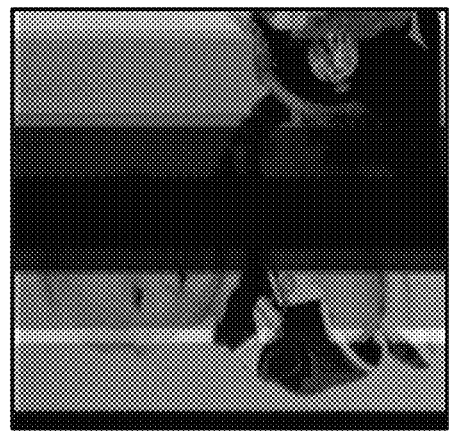
FIG. 7F depicts a computer simulated cloaking image for a cloaking assembly according to FIG. 1 with a 5° misalignment between a reference optical axis and a viewing angle of the cloaking assembly.

Referring now to FIGS. 7A-7F, images of an object positioned on the object-side 12 of the cloaking device assembly 10 and as viewed from the image-side 14 simulated using a commercial software program (Zemax OpticStudio) are depicted. The converging lenses 100, 140 were commercially available acylindrical lenses (AYL5040-A, Thorlabs) and the hexagonal prism 120 was formed out of a high index of refraction glass (LAS35; n=2) and had an angle θ equal to 75 degrees. FIG. 7A depicts an image of the object with no misalignment (0°) between the reference optical axis 16 and a viewing angle of the cloaking device assembly 10 from the +Y direction, i.e., an individual viewing the image I in the +Y direction along the reference optical axis 16. That is, as used herein, the term "misalignment" refers to an angle defined by the reference optical axis of a cloaking device assembly and a line of sight of an observer viewing the cloaking device assembly from the image-side as depicted by the +Y direction in the figures (also referred to herein as a "viewing angle"). FIG. 7B depicts an image of the object with a 1° misalignment between the reference optical axis 16 and a viewing angle of the cloaking device assembly 10. FIG. 7C depicts an image of the object with a 2° misalignment between the reference optical axis 16 and a viewing angle of the cloaking device assembly 10. FIG. 7D depicts an image of the object with a 3° misalignment between the reference optical axis 16 and a viewing angle of the cloaking device assembly 10. FIG. 7E depicts an image of the object with a 4° misalignment between the reference optical axis 16 and a viewing angle of the cloaking device assembly 10. FIG. 7F depicts an image of the object with a 5° misalignment between the reference optical axis 16 and a viewing angle of the cloaking device assembly 10. As shown by the images in FIGS. 7A-7E, an image of an object on the object-side 12 of the cloaking device assembly 10 can be seen clearly with up to 4° misalignment and is still visible with up to 5° of misalignment.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object" and "article," may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms as used herein—for example top and bottom—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
    an object-side, an image-side, a reference optical axis extending from the object-side to the image-side, and a cloaked region positioned between the object-side and the image-side;
    an object-side converging lens positioned on the object-side;
    an image-side converging lens positioned on the image-side; and
    a hexagonal prism positioned within the cloaked region between the object-side converging lens and the image-side converging lens;
    wherein the hexagonal prism comprising: a first object-side face, a first image-side face, and a first total internal reflection (TIR) face on a first side of the reference optical axis; and a second object-side face, a second image-side face, and a second TIR face on a second side of the reference optical axis opposite the first side; wherein the first object-side face and the second object-side face form an object-side apex on the reference optical axis, and the first image-side face and the second image-side face form an image-side apex on the reference optical axis; and
    wherein light from an object positioned on the object-side of the cloaking device and obscured by the cloaked region propagates through the object-side converging lens, the hexagonal prism, and the image-side converging lens to form an image of the object on the image-side of the cloaking device such that the cloaked region does not appear to be positioned between the object and the image.

2. The cloaking device of claim 1, wherein the object-side converging lens and the image-side converging lens each have an outward facing convex surface and an inward facing planar surface.

3. The cloaking device of claim 2, wherein light propagates through the cloaking device:
    via a first optical path of: the object to the outward facing convex surface of the object-side converging lens to the inward facing planar surface of the object-side converging lens to the first object-side face of the hexagonal prism to the second TIR face of the hexagonal prism to the first image-side face of the hexagonal prism to the inward facing planar surface of the image-side converging lens to the outward facing convex surface of the image-side converging lens forming a first portion of the image; and
    via a second optical path of: object to the outward facing convex surface of the object-side converging lens to the inward facing planar surface of the object-side converging lens to the second object-side face of the hexagonal prism to the first TIR face of the hexagonal prism to the second image-side face of the hexagonal prism to the inward facing planar surface of the image-side converging lens to the outward facing convex surface of the image-side converging forming a second portion of the image.

4. The cloaking device of claim 1, wherein the first TIR face and second TIR face are larger than the first object-side face, the first image-side face, the second object-side face and the second image-side face.

5. The cloaking device of claim 1, wherein the light incident on the image-side converging lens is focused generally parallel to the light from the object incident on the object-side converging lens to form the image of the object on the image-side of the cloaking device.

6. The cloaking device of claim 1, wherein the object-side converging lens and the image-side converging lens comprises a pair of plano-convex lenses, a pair of Fresnel lenses or a plane-convex lens and a Fresnel lens.

7. A cloaking device assembly comprising:
    an object-side, an image-side, a reference optical axis extending from the object-side to the image-side and a cloaked region positioned between the object-side and the image-side;
    a cloaked article positioned within the cloaked region;
    an object-side converging lens comprising an outward facing convex surface and an inward facing planar surface;
    an image-side converging lens comprising an outward facing convex surface and an inward facing planar surface; and a hexagonal prism positioned within the cloaked article between the object-side converging lens and the image-side converging lens;

wherein the hexagonal prism comprises: a first object-side face, a first image-side face, and a first total internal reflection (TIR) face positioned on a first side of the reference optical axis, wherein the first TIR face extends between the first object-side face and the first image-side face; and a second object-side face, a second image-side face, and a second TIR face positioned on a second side of the reference optical axis opposite the first side, wherein the second TIR face extends between the second object-side face and the second image-side face; wherein the first object-side face and the second object-side face form an object-side apex on the reference optical axis, and the first image-side face and the second image-side face form an image-side apex on the reference optical axis; and wherein light from an object positioned on the object-side of the cloaking device assembly and obscured by the cloaked region propagates through the object-side converging lens, the hexagonal prism and the image-side converging lens to form an image of the object on the image-side of the cloaking device assembly such that the cloaked region and the cloaked article within the cloaked region do not appear to be positioned between the object and the image.

8. The cloaking device assembly of claim 7, wherein the first TIR face and second TIR face are larger than the first object-side face, the first image-side face, the second object-side face and the second image-side face.

9. The cloaking device assembly of claim 7, wherein light propagates through the cloaking device assembly:

via a first optical path of: the object to the outward facing convex surface of the object-side converging lens to the inward facing planar surface of the object-side converging lens to the first object-side face of the hexagonal prism to the second TIR face of the hexagonal prism to the first image-side face of the hexagonal prism to the inward facing planar surface of the image-side converging lens to the outward facing convex surface of the image-side converging lens forming a first portion of the image; and via a second optical path of: object to the outward facing convex surface of the object-side converging lens to the inward facing planar surface of the object-side converging lens to the second object-side face of the hexagonal prism to the first TIR face of the hexagonal prism to the second image-side face of the hexagonal prism to the inward facing planar surface of the image-side converging lens to the outward facing convex surface of the image-side converging forming a second portion of the image.

10. The cloaking device assembly of claim 7, wherein:

light from the object incident on the object-side converging lens is focused onto the hexagonal prism by the object-side converging lens;

the light focused onto the hexagonal prism by the object-side converging lens is totally internally reflected within the hexagonal prism by the first TIR face and or the second TIR face;

the light totally internally reflected within the hexagonal prism propagates to and is incident on the image-side converging lens; and the light propagating from the hexagonal prism and incident on the image-side converging lens is focused generally parallel to the light from the object incident on the object-side converging lens to form the image of the object on the image-side of the cloaking device assembly.

11. A vehicle comprising:

a pillar; and a cloaking device positioned on the pillar, the cloaking device comprising:

an object-side, an image-side, a reference optical axis extending from the object-side to the image-side, and a cloaked region, wherein the pillar is positioned within the cloaked region, the object-side is positioned on an exterior of the vehicle and the image-side is positioned within an interior of the vehicle;

an object-side converging lens comprising an outward facing convex surface and an inward facing planar surface;

an image-side converging lens comprising an outward facing convex surface and an inward facing planar surface; and a hexagonal prism positioned within the pillar between the object-side converging lens and the image-side converging lens;

wherein the hexagonal prism comprises: a first object-side face, a first image-side face, and a first total internal reflection (TIR) face on a first side of the reference optical axis; and a second object-side face, a second image-side face, and a second TIR face on a second side of the reference optical axis opposite the first side; wherein the first object-side face and the second object-side face form an object-side apex on the reference optical axis, and the first image-side face and the second image-side face form an image-side apex on the reference optical axis; and wherein light from an object positioned on the object-side of the cloaking device and obscured by the cloaked region is focused onto the hexagonal prism by the object-side converging lens, totally internally reflected within the hexagonal prism by the first TIR face and/or the second TIR face, propagates to and is incident on the image-side converging lens, and is focused by the image-side converging lens to form an image of the object on the image-side of the cloaking device such that the cloaked region does not appear to be positioned between the object and the image.

12. The vehicle of claim 11, wherein the first TIR face and second TIR face are larger than the first object-side face, the first image-side face, the second object-side face and the second image-side face.

13. The vehicle of claim 11, wherein light propagates through the cloaking device:

via a first optical path of: the object to the outward facing convex surface of the object-side converging lens to the inward facing planar surface of the object-side converging lens to the first object-side face of the hexagonal prism to the second TIR face of the hexagonal prism to the first image-side face of the hexagonal prism to the inward facing planar surface of the image-side converging lens to the outward facing convex surface of the it converging lens forming a first portion of the image; and via a second optical path of: object to the outward facing convex surface of the object-side converging lens to the inward facing planar surface of the object-side converging lens to the second object-side face of the hexagonal prism to the first TIR face of the hexagonal prism to the second image-side face of the hexagonal prism to the inward facing planar surface of the image-side converging lens to the outward facing convex surface of the image-side converging forming a second portion of the image.

\* \* \* \* \*